United States Patent Office 3,845,041
Patented Oct. 29, 1974

3,845,041
7-HALOMETHYL-17-HYDROXY-3-OXO-17α-PREGN-4-ENE-21-CARBOXYLIC ACID γ-LACTONES
Leland J. Chinn, Morton Grove, Ill., assignor to
G. D. Searle & Co., Chicago, Ill.
No Drawing. Filed Dec. 26, 1973, Ser. No. 428,301
Int. Cl. C07c 173/00
U.S. Cl. 260—239.57                               4 Claims

ABSTRACT OF THE DISCLOSURE

Preparation of 7 - halomethyl - 17 - hydroxy-3-oxo-17α - pregn - 4 - ene - 21 - carboxylic acid γ-lactones, the facile separability of mixtures thereof by chromatography, and their corresponding utility as intermediates to 6,7 - dihydro - 17 - hydroxy - 3 - oxo - 3'$\underline{\text{H}}$-cyclopropa-[6,7] - 17α - pregn - 4 - ene-21-carboxylic acids and salts are disclosed.

This invention relates to 7 - halomethyl - 17 - hydroxy-3 - oxo - 17α - pregn - 4 - ene - 21 - carboxylic acid γ-lactones and a process for the preparation thereof. More particularly, this invention provides new, useful, and unobvious chemical intermediates of the formula

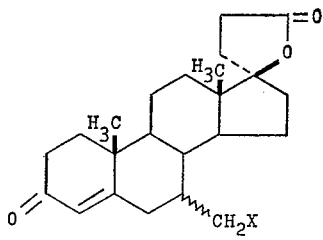

wherein X represents halogen and the wavy line indicates that the 7-halomethyl can be in either α or β configuration. Among the halogens contemplated by X—which consist of fluorine, chlorine, bromine, and iodine—chlorine is preferred.

The compounds to which this invention relates are useful as intermediates to the 6,7 - dihyro - 17 - hydroxy-3 - oxo - 3'$\underline{\text{H}}$ - cyclopropa[6,7] - 17α - pregn - 4 - ene-21-carboxylic acids and salts disclosed in U.S. 3,755,381. Unlike 6,7 - dihydro - 17 - hydroxy - 3 - oxo-3'$\underline{\text{H}}$-cyclopropa[6,7] - 17α - pregn - 4 - ene - 21 - carboxylic acid γ-lactones, which are laboriously purified by a combination of chromatography and multiply repeated crystallizations according to Example 1 in U. S. 3,763,147 prior to conversion to the acids and salts of U.S. 3,755,381 by the processes disclosed therein, the 7α-halomethyl and 7β-halomethyl compounds of this invention are readily separable from each other in high yield and purity by chromatography and a single recrystallization—even when present in mixtures relatively poor in one or the other isomer—and serve thus as unexpectedly preferable means of preparing the aforesaid acids and salts in stereochemically homogeneous forms.

Another unexpected property of the instant compounds is the absence, in standardized tests therefor, of the antidesoxycorticosterone (anti-DCA) activity which characterizes 6,7 - dihydro - 17 - hydroxy - 3 - oxo-3'$\underline{\text{H}}$-cyclopropa[6,7] - 17α - pregn - 4 - ene - 21 - carboxylic acid γ-lactones, corresponding hydroxy acids, and salts of the acids, as also a prior art compound distinguished by the absence of halogen, namely, 17 - hydroxy - 7α - methyl-3-oxo - 17α - pregn - 4 - ene - 21 - carboxylic acid γ-lactone [J. Org. Chem., 26, 3077 (1961)].

A further property of the 7β-halomethyl compounds of this invention is their antiprogestational activity: They inhibit the arborization of endometrical glands induced by progesterone.

Preparation of the subject compounds proceeds by contacting either or both 6,7 - dihydro -17 - hydroxy-3-oxo-3'$\underline{\text{H}}$ - cyclopropa[6,7] - 17α - pregn - 4 - ene - 21 - carboxylic acid γ-lactones with an alkanol solution of excess aqueous hydrogen halide and, where a mixture of the 6α,7α and 6β,7β isomers is the starting material, separating the reaction product into substantially pure 7α-halomethyl and 7β-halomethyl compounds of the invention by chromatography. As an exception to the foregoing procedure, the 7-fluoromethyl compounds of the invention are prepared by contacting an appropriate 7-iodomethyl compound hereof with silver fluoride in dimethyl sulfoxide.

Upon contacting an alkanol solution of a 7-halomethyl compound of this invention with 2 equivalents of base, the corresponding salt of 6,7 - dihydro - 17 - hydroxy-3-oxo - 3'$\underline{\text{H}}$ - cyclopropa[6,7] - 17α - pregn - 4 - ene - 21-carboxylic acid is formed.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A mixture of 3 parts of 6α,7α - dihydro - 17 - hydroxy-3 - oxo - 3'$\underline{\text{H}}$ - cyclopropa[6,7] - pregn - 4 - ene-21-carboxylic acid γ-lactone (U.S. 3,763,147), 11 parts of 20% hydrochloric acid, and 40 parts of methanol is heated at the boiling point under reflux for 2 hours, then concentrated to approximately 1/10 volume by vacuum distillation. The resultant mixture is chilled and then filtered. The insoluble solids thus isolated are washed with water, dried in air, and crystallized from isopropyl acetate to give 7β - chloromethyl - 17 - hydroxy - 3 - oxo - 17α - pregn-4-ene-21-carboxylic acid γ-lactone melting at 210–214°.

EXAMPLE 2

A mixture of 13 parts of 6β,7β-dihydro-17-hydroxy-3-oxo-3'$\underline{\text{H}}$-cyclopropa[6,7] - 17α - pregn - 4 - ene - 21 - carboxylic acid γ-lactone (U.S. 3,763,147), approximately 70 parts of 20% hydrochloric acid, and 265 parts of methanol is heated at the boiling point under reflux for 2 hours, then concentrated to 1/20 volume by vacuum distillation. The resultant mixture is chilled and then filtered. The insoluble solids thus isolated are washed with methanol, dried in air, and recrystallized from aqueous methanol to give 7α-chloromethyl - 17-hydroxy - 3-oxo-17α-pregn-4-ene-21-carboxylic acid γ-lactone melting at 185–188°.

EXAMPLE 3

Substitution of 15 parts of 48% hydrobromic acid for the hydrochloric acid called for in Example 1 affords, by the procedure there detailed, 7β-bromomethyl-17-hydroxy - 3 - oxo-17α-pregn-4-ene-21-carboxylic acid γ-lactone.

EXAMPLE 4

Substitution of 100 parts of 48% hydrobromic acid for the hydrochloric acid called for in Example 2 affords, by the procedure there detailed, 7α-bromomethyl-17-hydroxy-3-oxo-17α-pregn-4-ene-21-carboxylic acid γ-lactone.

EXAMPLE 5

Substitution of 23 parts of 50% hydriodic acid for the hydrochloric acid called for in Example 1 affords, by the procedure there detailed, 17-hydroxy - 7β-iodomethyl-3-oxo - 17α - pregn-4-ene - 21-carboxylic acid γ-lactone.

The same product can also be prepared by substituting an excess of 10% potassium iodide in formic acid for the aqueous methanol solution of hydriodic acid in the foregoing procedure.

EXAMPLE 6

Substitution of 165 parts of 50% hydriodic acid for the hydrochloric acid called for in Example 2 affords, by the procedure there detailed, 17-hydroxy - 7α-iodomethyl-3-oxo - 17α-pregn-4-ene-21-carboxylic acid γ-lactone melting at 212–214°.

Alternatively, 17-hydroxy-7α-iodomethyl - 3 - oxo-17α-pregn-4-ene-21-carboxylic acid γ-lactone can be prepared by contacting approximately 34 parts of 6β,7β-dihydro - 17 - hydroxy - 3-oxo-3'Hcyclopropa[6,7] - 17α - pregn - 4-ene - 21 -carboxylic acid γ-lactone with a mixture of approximately 130 parts of potassium iodide in 110 parts of formic acid for 6 hours at 25°, then pouring the reaction mixture into 10 volumes of water, filtering out the insoluble solids, and taking them up in a minimum quantity of dichloromethane, washing the dichloromethane solution consecutively with aqueous 2% sodium thiosulfate and a saturated aqueous solution of sodium chloride, stripping the solvent by vacuum distillation, and recrystallizing the product from methanol.

EXAMPLE 7

A mixture of 1 part of 17-hydroxy-7β-iodomethyl-3-oxo-17α-pregn - 4-ene-21 - carboxylic acid γ-lactone, 4 parts of silver fluoride, and 45 parts of dimethyl sulfoxide is stirred at 30° for 30 hours in a nitrogen atmosphere. The reaction mixture is then diluted with 500 parts of water. The resultant mixture is extracted with ethyl acetate. The ethyl acetate extract is washed with water, dried over anhydrous sodium sulfate, and stripped of solvent by vacuum distillation to afford 7β-fluoromethyl - 17-hydroxy - 3-oxo-17α-pregn - 4-ene - 21-carboxylic acid γ-lactone.

EXAMPLE 8

Substitution of 1 part of 17-hydroxy - 7α-iodomethyl-3-oxo-17α - pregn-4 - ene-21-carboxylic acid γ-lactone for the 7-isomer called for in Example 7 affords, by the procedure there detailed, 7α-fluoromethyl - 17-hydroxy-3-oxo-17α-pregn-4-ene-21-carboxylic acid γ-lactone.

EXAMPLE 9

To 15 parts of a mixture consisting of 10% 6α,7α-dihydro - 17 - hydroxy-3-oxo-3'H-cyclopropa[6,7]-17α-pregn-4-ene - 21 - carboxylic acid γ-lactone and 90% of the 6β,7β-dihydro isomer is added approximately 70 parts of hydrochloric acid and 265 parts of methanol. The resultant mixture is heated at the boiling point under reflux for 2 hours, then concentrated to 1/20 volume by vacuum distillation. The residue is diluted with 10 volumes of water, and the mixture thus obtained is neutralized with a saturated aqueous solution of sodium bicarbonate. Insoluble solids are filtered out, washed with water, dried in air, and taken up in benzene. The benzene solution is chromatographed on silica gel, using benzene and mixtures thereof with increasing amounts of ethyl acetate as developing solvents. From an eluate comprising 10% ethyl acetate in benzene, on evaporation of solvent and recrystallization of the residue from ethyl acetate, 7α-chloromethyl - 17-hydroxy-3 - oxo - 17α-pregn-4-ene - 21-carboxylic acid γ-lactone melting at 188–191° is obtained. From an eluate comprising 15% ethyl acetate in benzene, on evaporation of solvent and crystallization of the residue from ethyl acetate, 7β-chloromethyl - 17-hydroxy - 3-oxo-17α-pregn-4-ene-21-carboxylic acid γ-lactone melting at 217–218° is obtained.

EXAMPLE 10

A mixture of 10 parts of 7β-chloromethyl - 17-hydroxy-3-oxo - 17α-pregn - 4-ene-21-carboxylic acid γ-lactone, 12 parts of aqueous 20% potassium hydroxide, and 160 parts of 2-propanol is heated at the boiling point under reflux in a nitrogen atmosphere for 4 hours. Insoluble solids are filtered out, and the filtrate is concentrated to the point of incipient precipitation by vacuum distillation. The precipitate which forms is filtered off, washed with 2-propanol, and dried in air. This material is potassium 6α,7α-dihydro - 17-hydroxy-3-oxo - 3'H-cyclopropa[6,7]-17α-pregn - 4-ene-21-carboxylate melting at 235–244°, with decomposition.

What is claimed is:
1. A compound of the formula

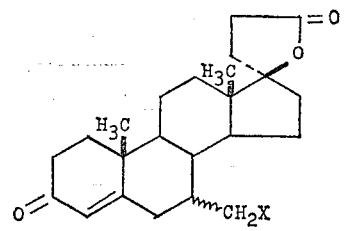

wherein X represents halogen and the wavy line indicates that the 7-halomethyl can be in either α or β configuration.

2. A compound according to Claim 1 which is 7β-chloromethyl - 17 - hydroxy - 3 - oxo - 17α - pregn-4-ene-21-carboxylic acid γ-lactone.

3. A compound according to Claim 1 which is 7α-chloromethyl - 17 - hydroxy - 3-oxo-17α-pregn - 4-ene - 21-carboxylic acid γ-lactone.

4. A compound according to Claim 1 which is 17-hydroxy-7α-iodomethyl - 3-oxo-17α-pregn - 4-ene-21-carboxylic acid γ-lactone.

References Cited
UNITED STATES PATENTS 3,472,882  10/1969  Berkoz _____ 260—397.3
3,509,136  4/1970   Brown _____ 260—239.57

ELBERT L. ROBERTS, Primary Examiner

U.S. Cl. X.R.

260; 424—241